US012044504B1

(12) United States Patent
Kennedy et al.

(10) Patent No.: US 12,044,504 B1
(45) Date of Patent: Jul. 23, 2024

(54) DIGITALLY CONTROLLED MOBILE GROUND LAUNCHING FIRE RETARDANT DELIVERY SYSTEM

(71) Applicants: Stephen Kennedy, Salinas, CA (US); Morgan Davis Kennedy, Salinas, CA (US)

(72) Inventors: Stephen Kennedy, Salinas, CA (US); Morgan Davis Kennedy, Salinas, CA (US)

( * ) Notice: Subject to any disclaimer, the term of this patent is extended or adjusted under 35 U.S.C. 154(b) by 86 days.

(21) Appl. No.: 17/864,330

(22) Filed: Jul. 13, 2022

Related U.S. Application Data

(60) Provisional application No. 63/222,161, filed on Jul. 15, 2021.

(51) Int. Cl.
*F41F 1/00* (2006.01)
*A62C 3/02* (2006.01)
*A62C 31/28* (2006.01)
*F41B 3/04* (2006.01)

(52) U.S. Cl.
CPC ................ *F41F 1/00* (2013.01); *A62C 3/025* (2013.01); *A62C 31/28* (2013.01); *F41B 3/04* (2013.01)

(58) Field of Classification Search
CPC ...... F41F 3/00; F41F 1/00; F41B 3/04; A62C 3/025; A62C 3/02; A62C 3/2228; A62C 3/0235; A62C 31/28; A63H 17/006; A63H 33/18; A63H 27/004
See application file for complete search history.

(56) References Cited

U.S. PATENT DOCUMENTS 4,607,605 A * 8/1986 Rutten ...................... F41B 3/04 124/6
5,857,451 A * 1/1999 Ciluffo ...................... F41B 3/04 124/6
9,452,339 B1 * 9/2016 Shah ......................... F41B 4/00
2003/0006047 A1 * 1/2003 Silverstein ............. A63B 60/54 169/36
2015/0082977 A1 * 3/2015 Tikochinski .............. F41H 5/20 89/41.01
2016/0367846 A1 * 12/2016 Haines ................... A62C 31/05
2017/0232578 A1 * 8/2017 Westmeyer ............... F41B 3/04 124/6

FOREIGN PATENT DOCUMENTS

KR 102088955 * 3/2020 ................ F41B 3/04
KR 20210087774 * 7/2021 ............. A62C 3/025

* cited by examiner

*Primary Examiner* — John E Simms, Jr.
(74) *Attorney, Agent, or Firm* — Donald R. Boys; Central Coast Patent Agengy LLC

(57) ABSTRACT

A digitally controlled mobile ground launching fire retardant delivery system. The system is configured to launch fire retardant projectiles at wildfires located in a small fire area that is considered inaccessible by fire personnel, due to the terrain, elevation and/or remote location. The system is also advantageously configured to launch soft-ball size objects at remote wildfires. The soft ball sized objects will contain at least one beneficial fire-retardant substance contained therein.

8 Claims, 10 Drawing Sheets

DIGITALLY CONTROLLED MOBILE GROUND LAUNCHING FIRE RETARDANT DELIVERY SYSTEM

PRIORITY CLAIM

This non-provisional application is entitled to the benefit of, and claims priority to Provisional Patent Application Ser. No. 63/222,161, entitled "Digitally Controlled Mobile Ground Launching Fire Retardant Delivery System", filed on Jul. 15, 2021; which is included by reference as fully set forth herein.

TECHNICAL FIELD

The present invention relates generally to improvements in firefighting technology, particularly ground level fire suppression techniques, applied in the defense of private and public property, and human and animal life, against the ravaging and destructive forces of wildfires caused by lightning, accident, arson and/or terrorism in remote areas.

BACKGROUND OF THE INVENTION

There is a continuing need for easier, faster, safer, and more effective systems and methods for treating/fighting fires, namely wildfires in remote areas that are difficult to reach.

Current wildfires and even other destructive fires (structures) can often be out-of-reach of local fire departments and even state/regional departments for approach in order to suppress these fire problems. When a lightning strike or human-caused fire, particularly in rural areas of California, is initially reported, many may be small in acreage size, but the terrain is unfortunately inaccessible. Such small fires can erupt into much larger forest or brush fires, due to the time it takes for air support to be called in, if even available. These fires according to the latest findings are occurring much more frequently in California and the Western part of the nation, due to many reasons, including climate change.

Emerging and current technology, including geosynchronous satellites that are able to locate areas endangered by fire ("hot-spots") and report said information with specific GPS coordinates to the proper fire command are currently available with a reporting frequency of every 15 minutes. Current technology also includes the development of beneficial material placed inside a ball shape container (softball size), which advantageously holds and releases the beneficial material which can put out or suppress small fires when tossed into an area of the fire.

In light of the shortcomings in the prior art, there is definitely a need for an improved way of combat and/or suppress fires that do not suffer from the disadvantages noted above.

SUMMARY OF THE INVENTION

The present invention relates to a new mobile ground unit apparatus that allows for the delivery of fire retardant to a small fire area, which is considered inaccessible by fire personnel, due to the terrain, possible elevation and/or remoteness of the wildfire.

The present invention also relates to a new apparatus that property owners can utilize, namely a smaller designed unit for the protection of property by stopping or suppressing ground fires that are approaching their property.

The present invention further relates to a mechanical means of getting fire retardant to areas where not only fire personnel could use such an apparatus on small brush or beginning forest fires, but also homeowners could advantageously utilize by using this delivery system to provide a protective fire line to help protect one's properties.

Another aspect of the present invention is to provide a smaller unit with a minimum tube radius of only 2 feet that is programmed by putting in approximate distance, direction and elevation and possible current wind speeds. This system could be manufactured using basic similar technology, but on a smaller unit size (less ability to reach areas at a longer distance) and a simpler manual input basis to be used by (property owners) consumers.

Another aspect of the present invention is to provide a smaller unit that is programmed to allow a user to input approximate distance, direction and elevation and possible current wind speeds. This system could be manufactured using basic similar technology, but on a smaller unit size (less ability to reach areas at a longer distance) and a simpler input basis to be used by (property owners) consumers.

For a better understanding of the present invention, its functional advantages and the specific objects attained by its uses, reference should be made to the accompanying drawings, claims and descriptive matter in which there are illustrated embodiments of the invention.

DETAILED DESCRIPTION

The following detailed description is of the best currently contemplated modes of carrying out various embodiments of the invention in which said embodiments can be carried out independently and/or in combination. The description is not to be taken in a limiting sense but is made for at least the purpose of illustrating the general principles of the invention, since the scope of the invention is best defined by the appended claims.

In one aspect, the present invention pertains to the field of catapult or thrower systems for the treatment and extinguishment of wildfires, and equipment therefor.

In an embodiment, an apparatus for delivering launched objects comprises: an antenna; a receiver; a base; a vertical shaft through the base; and a rotatable hollow tube arm mounted on the vertical shaft, wherein the rotatable hollow tube arm comprises: an opening configured to allow launching vessels to pass through; and a release mechanism.

In an embodiment, a system comprises: a vessel launcher, the vessel launcher comprising: an antenna; a receiver; a base; a vertical shaft through the base; and a rotatable hollow tube arm mounted on the vertical shaft, wherein the rotatable hollow tube arm comprises: an opening configured to allow launching vessels to pass through; and a release mechanism; a plurality of vessels; and a computing device communicatively coupled to the delivery device.

In one embodiment, the present invention relates to a new mobile ground unit apparatus that allows for the delivery of fire retardant to a small fire area, which is considered inaccessible by fire personnel, due to the terrain, possible elevation and/or remoteness of the wildfire.

In another embodiment, the present invention relates to a new apparatus that property owners can advantageously utilize, namely a smaller designed unit for the protection of property by stopping or suppressing ground fires that are approaching their property.

The present invention is further directed to a mechanical means of getting fire retardant to areas where not only fire personnel could use such an apparatus on small brush fires or the beginning of forest fires, but also homeowners could utilize by using this delivery system to provide a protective fire line to help protect one's properties.

It should be understood that the foregoing relates to various embodiments of the present invention which can be carried out independently and/or in combination and that modifications may be made without departing from the spirit and scope of the invention. It should be further understood that the present invention is not limited to the designs mentioned in this application and the equivalent designs in this description, but it is also intended to cover other equivalents now known to those skilled in the art, or those equivalents which may become known to those skilled in the art in the future.

Figure 1:
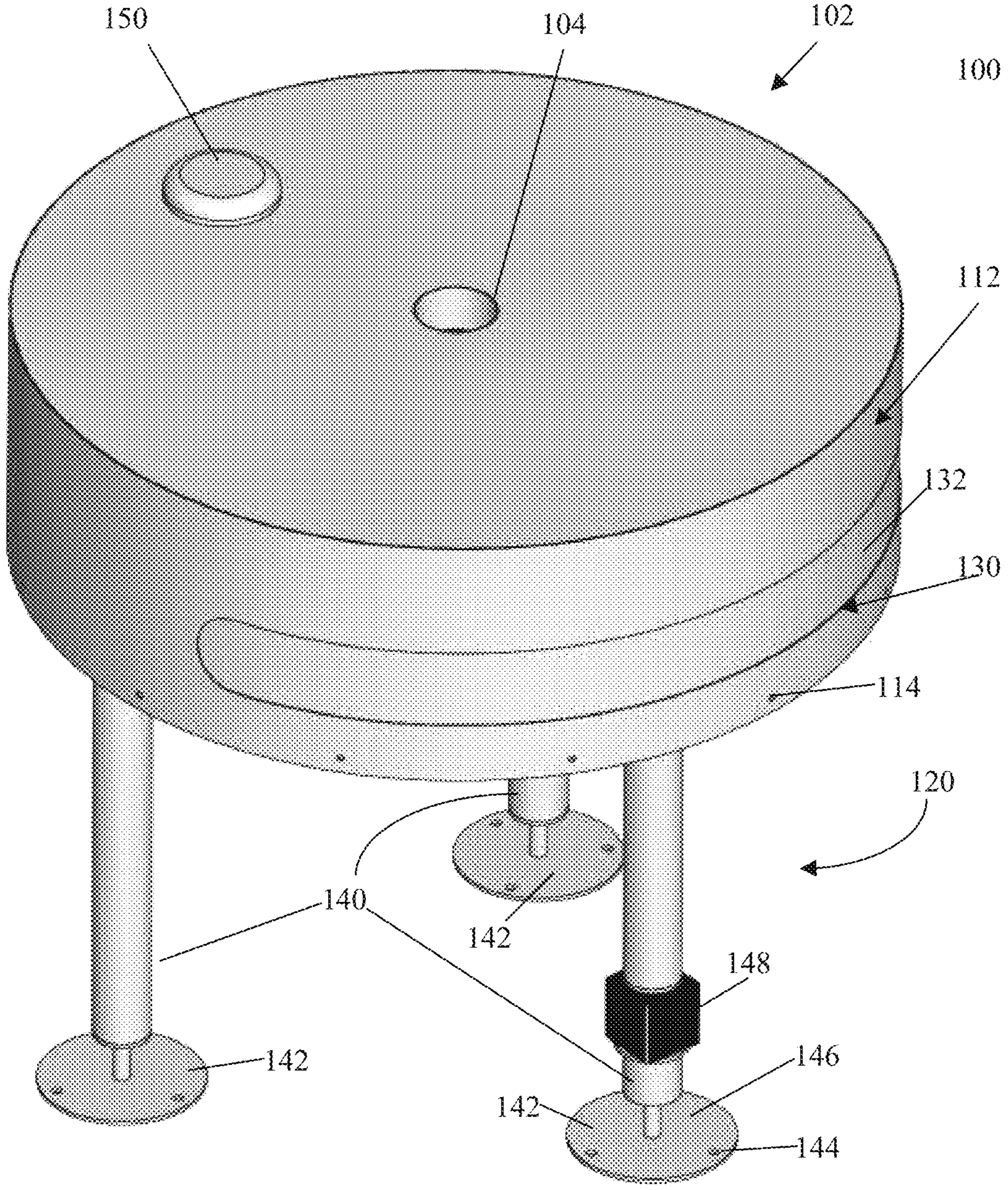
FIG. 1 shows a mobile ground fire retardant delivery system, in an embodiment.

FIG. 1 shows a mobile ground fire retardant delivery system, in an embodiment. The delivery system 100 includes, among other things, a housing 102 with vessel opening 104 for launching vessels 106 (not depicted) in center of housing unit. Housing 102 includes a cover 112, connections 114 (e.g., screws\bolts), and handles 116 (not shown) for movement of the device as discussed herein. Housing 102 includes a lower portion 120 and openable protective shielding enclosure 130 (shown in a closed configuration). Lower portion 120 includes legs 140, each having feet 142. Feet 142 include holes 144 and plate 146, which in embodiments provide for stability and movement of the device. Servo-motor actuator 148 (e.g., in embodiments, a motorized adjustable screw 148) enables movement of select legs of the delivery system to be adjusted, as described herein. System 100 further includes an antenna 150 (e.g., for a Global Navigational Satellite System (GNSS)) for communication with satellites 160 (e.g., hot-spot surveillance satellite(s); not shown). Antenna 150 may be located on the top of cover 112 to receive signals, such as launcher coordinate positioning data. Shielding enclosure 130 includes a movable portion 132 for use with vessel launching, such as described herein. In embodiments hot-spot data may be received from third parties, such as governmental agencies. Third party data may be input manually into the launcher or provided wirelessly to the launcher, such as via a tablet computer, smart phone or other mobile computing device.

Vessel opening 104 may be used to receive launching vessels, such as softball-shaped fire retardant containers. In embodiments, vessel opening 104 comprises a vessel drop down tube through which fire retardant-carrying vessels are placed and move through.

In embodiments cover 112 may be partially or fully liftable from the lower portion 120 of housing 102, such as for maintenance or troubleshooting purposes. For example, connectors 114 may comprise extracting screws/bolts, and after their removal the top and sides of the cover may be removed.

Figure 2:
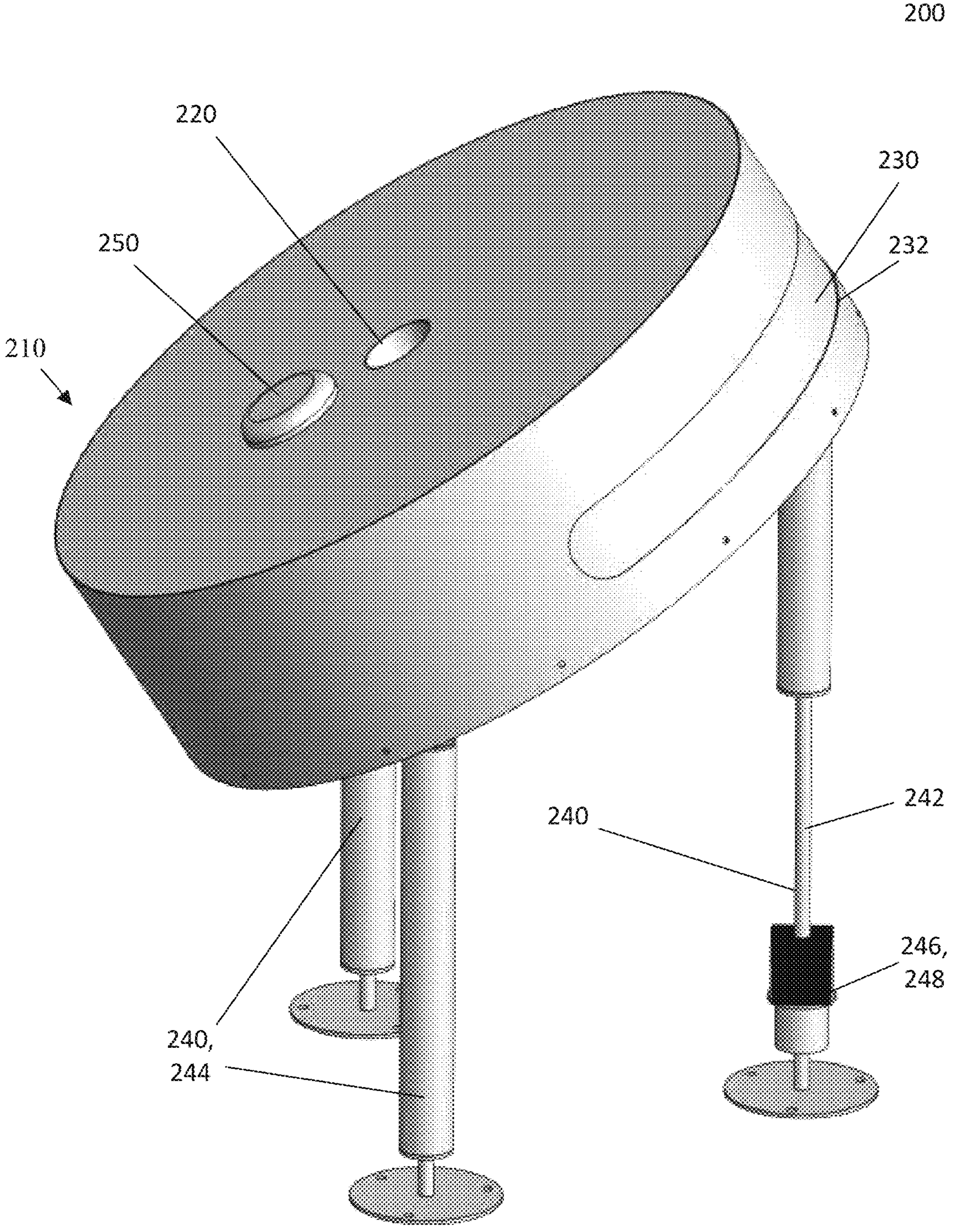
FIG. 2 shows an angled launcher for the system of FIG. 1 with closed protective shield, in an embodiment.

FIG. 2 shows an angled launcher for the system of FIG. 1 with closed protective shield, in an embodiment. Launcher 200 includes, among other things, a housing 210 (e.g., with reference to FIG. 1, a housing 102) having vessel feed entrance 220, and closed protective shield portion 230 having aperture 232 (shown in a closed position). In the embodiment of FIG. 2, launcher 200 is shown in an upward position. As depicted in FIG. 2, launcher 200 includes a set three legs 240, which in turn includes an extended front leg 242 and back legs 244. Front leg 242 includes a front leg adjustment mechanism including servo-motor 246 and screw actuator 248. In embodiments, servo-motor 246 and screw actuator 248 operate to adjust the height of front leg 242 and thus the angle and orientation of launcher 200 and housing 210. The angle and orientation of launcher 200 and housing 210 may thereby be adjusted to launch vessels stored within the launcher 200 to specific locations, by use of centrifugal force and a rotating arm stored within the housing 210.

Launcher 200 further includes antenna 250 (e.g., with reference to FIG. 1, antenna 150) for communication with satellites 252 (not illustrated). For example, antenna 250 may be a multi frequency L1/L5 GNSS (Global Navigation Satellite System) antenna to obtain GPS location coordinates from authorized hot-spot satellite(s) by wireless connection, and provide the coordinates to a controller unit (not shown) attached to the bottom of the housing 210. In embodiments, data from the authorized hot-spot satellite(s) may be used for specific adjustments to launcher 200 to target particular fire areas that can be controlled or slowed down in advance of personnel or aircraft arriving at the fire areas.

In embodiments, the extension of front leg 242 causes the housing 210 to be lifted with back legs 244, providing stability when bolted down to a stable plate or trailer. Furthermore, in embodiments vessel feed entrance 220 may connect to a tube through which fire retardant vessels are placed into and move through. Feeding may be provided automatically or manually, in an embodiment. In an embodiment, the vessel has an approximate softball size and shape so a user may feed the vessels.

Figure 3:
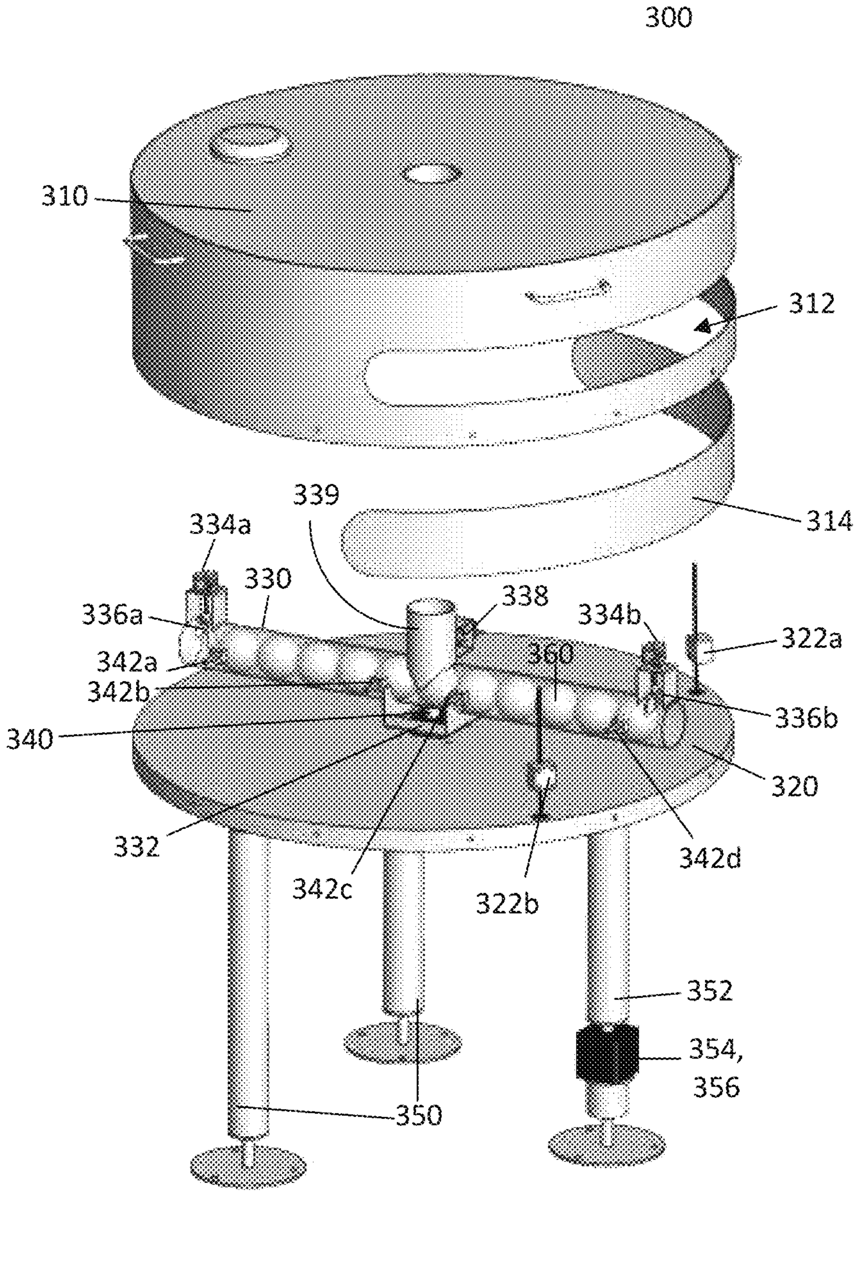
FIG. 3 shows an exploded view of a housing for a mobile ground fire retardant delivery system, in an embodiment.

FIG. 3 shows an exploded view of a housing for a mobile ground fire retardant delivery system, in an embodiment. FIG. 3 shows an exploded view of a launcher 300 for use with a delivery system as in FIG. 1, comprising a cover 310 including opening 312 and movable shielding portion 314. A tube mount 320 is coupled to servo-motor actuators **322*a* and 322*b*, shown in a lower (closed) position, which are coupled to tube mount 320 for raising and lowering the shielding portion 314. In embodiments the servo-motor actuators 322*a* and 322*b* are equidistant from each other. Rotatable hollow tube arm 330 is coupled to DC motor shaft 340 and is mounted on bracket 332 (e.g., via bearings), and includes servo-motor actuators 334*a* and 334*b*, on each end of tube arm 330, for use in conjunction with gates 336*a* and 336*b*. In embodiments, tube arm 330 has a radius of approximately 2 feet. Feed actuator 338 is attached to the drop down vessel tube 339 (in embodiments, also called feeder tube 339), which in embodiments may be located at least substantially above the center of tube arm 330. In embodiment feed actuator 338 is a linear actuator that serves to open up a gate 370 (not shown) to allow vessels to be received into the tube based on calculations and data received from proximity sensors 342***a*, 342*b*, 342*c* and 342*d*. In an embodiment, proximity sensors as described herein may be capacitive sensors and may be capable of sensing both metal and non-metallic material.

The launcher 300 includes legs 350, including adjustable front leg 352 and corresponding servo-motor 354 and screw actuator 356. In embodiments, in operation, rotatable hollow tube arm 330 may spin to create centrifugal force and thereby project, throw, deliver, launch or otherwise move vessels 360 stored within the tube arm 330 to desired locations. Vessels 360 may be launched and released in conjunction with gates 336*a* and 336*b* being opened and closed (e.g., raised and lowered) according to data and programming timing. Proximity sensors as described herein may provide additional data to controller units, which among other things may assist with releasing vessels at a properly timed basis to help achieve tube equilibrium as well as accurately target the vessels to locations.

In embodiments, gates 336*a* and 336*b* on the tube arm, and other gates as described herein, may be configured to withstand forces associated with higher revolutions per minute of the rotatable hollow tube arm. Increased revolutions per minute may result in greater forces applied to the gates, resulting in them not opening and shutting as intended (e.g., as the desired speeds). With such in mind, for example, a plurality of ball bearings may be attached to the surfaces of the gates or other appropriate surfaces to provide a frictionless surface on the inside portions of the gates. Among other things, the gates may thereby properly move with the vessel pressure on the gates.

In embodiments, gates 336 and 336*b* open and close at a speed from 0.1 meter per second (m/s) to more than 1 m/s. In an example, vessels such as described herein may be capable of handling forces ranging from approximately 1,000 pounds of force to approximately 3,000 pounds of force. In embodiments, reduced vessel weight is associated with longer distances of delivery, as well as reduced force on vessels and better operation of launcher gates. In a further example, vessels such as described herein may have a weight ranging from approximately 0.5 pounds to 4.4 pounds. For example, in embodiments herein a vessel weighing 0.25 kg and capable of handling 3,000 pounds of force may be launched at least approximately 2 miles.

In an embodiment, rotatable hollow tube arm 330 may spin so that centrifugal force causes vessels to release in a straight direction. In further embodiments, the housing 300 is configured to provide an opening (e.g., opening 312) so that rotatable hollow tube arm 330 will launch vessels at specific angles of direction, and an operator of the system does not reposition the launcher.

In embodiments, feed actuator 338 includes a high-speed linear ball screw type actuator and gate 370 includes a sliding steel plate which, upon receiving a programming command from a controller unit coupled to gate 370, will raise or lower. The programming command may be based on digital data, such as a required number of RPMs to obtain a certain calculated distance, weight of the vessel(s) to be launched, gravity constant, headwinds or crosswinds, or other data and calculations providing for an accurate targeting process for launching the vessels.

In embodiments proximity sensors 342*a*, 342*b*, 342*c* and 342*d* are coupled to one or more components of a delivery system (e.g., a controller unit) to provide data to help in proper tube equilibrium as well as timing of release of vessels. A controller unit may be coupled physically, wirelessly, a combination of both or otherwise, to the proximity sensors to receive data and perform calculation. In embodiments controller unit may further be controlled to some or all of the other components of the launcher to control aspects of the launching sequence (e.g., to properly time vessels to be received into the rotating tube, and to release vessels from tube arm 330). In embodiments, the vessels may have a diameter which is at least approximately one-half the diameter of tube arm 330. The controller unit may include a GPS receiver circuit board for controlling components of the launcher. In an embodiment the GPS receiver circuit board may be Wide Area Augmentation System (WAAS) enabled to lock onto codes used by WAAS satellites, and compute WAAS corrections to GPS signals to obtain corrected GPS data.

Figure 4:
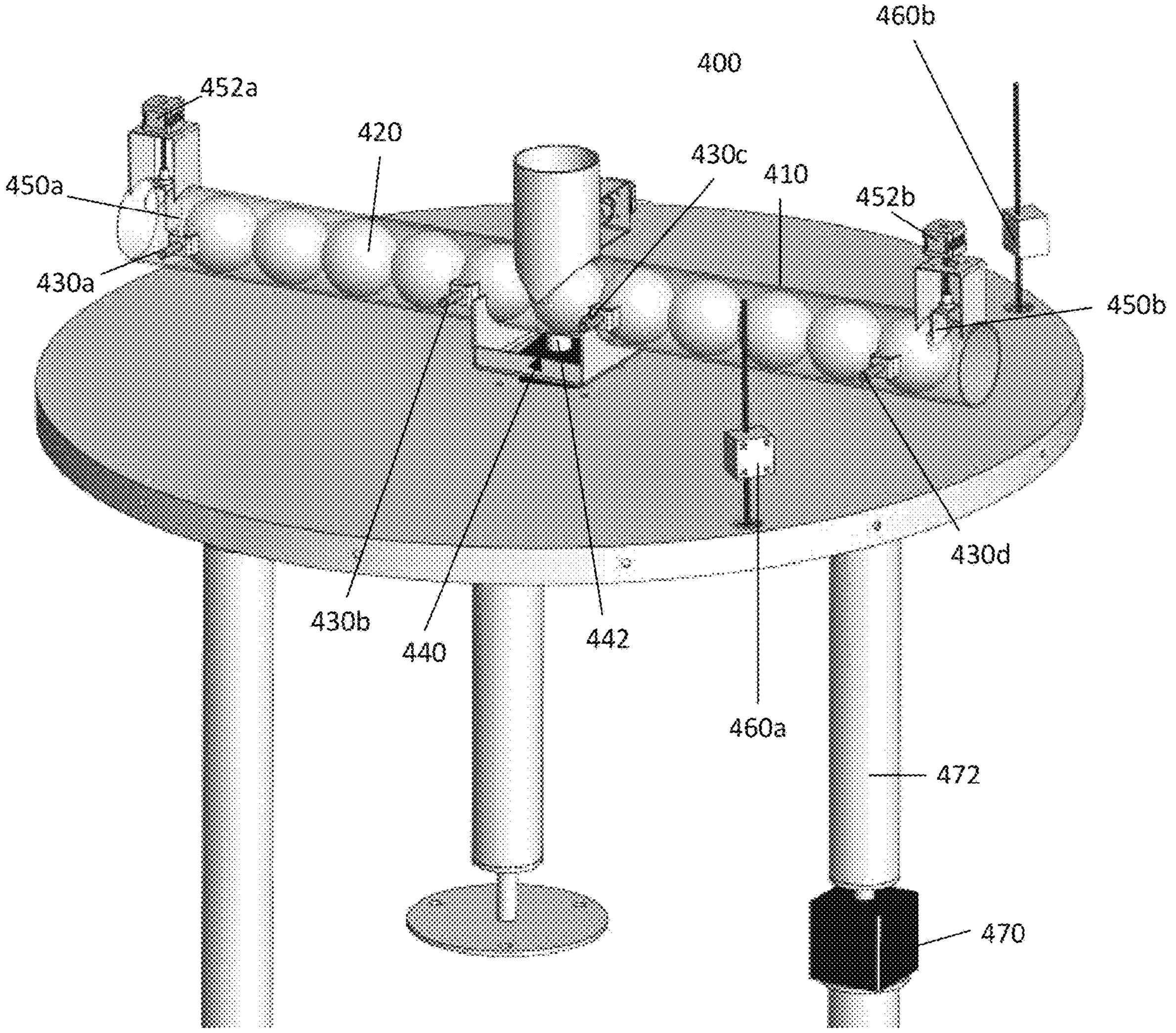
FIG. 4-5 show a mobile ground fire retardant delivery system with a tube mount, in an embodiment.
Figure 5:
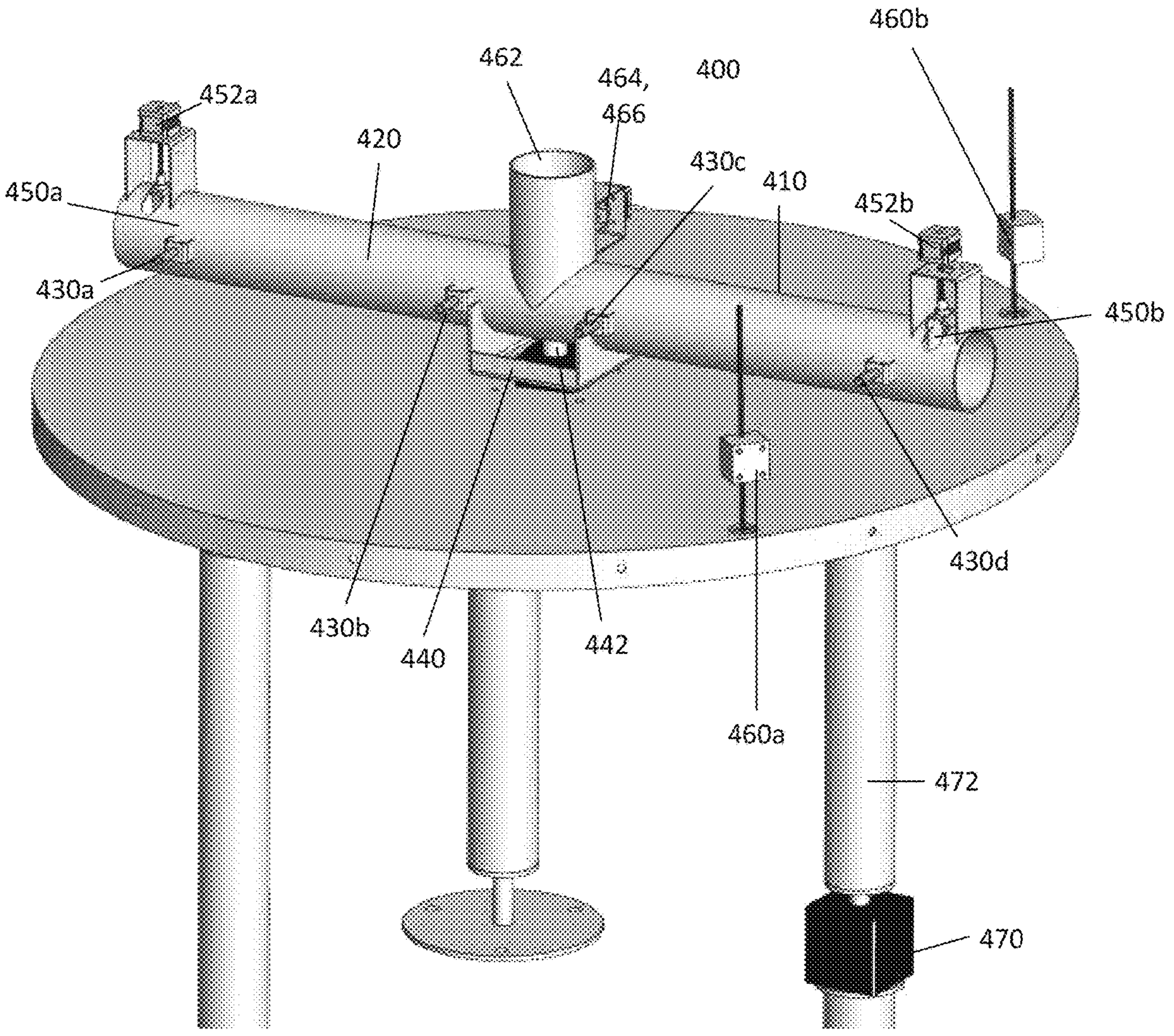

FIG. 4-5 show a mobile ground fire retardant delivery system with a tube mount, in an embodiment. FIG. 4 shows an exploded view of a tube for delivering vessels. Among other things, delivery system 400 includes a rotating tube 410 with vessels 420, proximity sensors 430*a*, 430*b*, 430*c* and 430*d*, combined tube/arm mount and bearing unit 440, DC motor shaft 442, gates 450*a* and 450*b*, and frontside protective shield servo-motor actuators 460*a* and 460*b*. Gates 450*a* and 450*b* are controlled by corresponding actuators 452*a* and 452*b*. which open and close gates 450*a* and 450*b* at high speed according to calculations and data for how the vessels are to be launched. Motorized screw actuator 470 may be used (e.g., by a controller unit) to raise and lower associated front leg 472.

FIG. 5 depicts the mobile ground fire retardant delivery system of FIG. 4 with the exterior of rotating tube 410. Feed tube 462 and feed tube actuator 464 enable vessels to be received into the rotating tube 410. In embodiments, the timing for how the vessels are received is controlled via launching data and calculations from a controller unit (not shown).

In embodiments proximity sensors 430*a*, 430*b*, 430*c* and 430*d* are coupled to one or more components of delivery system 400 (e.g., a controller unit) to provide data to help in proper tube equilibrium as well as timing of release of vessels. A controller unit may be coupled physically, wirelessly, a combination of both or otherwise, to the proximity sensors to receive data and perform calculation. In embodiments controller unit may further be controlled to some or all of the other components of the launcher to control aspects of the launching sequence (e.g., to properly time vessels to be received into the rotating tube, and to release vessels from rotating tube 410).

In operation, frontside protective shield servo-motor actuators 460*a* and 460*b* may be used to open and close a protective shield (e.g., with reference to FIG. 1, movable portion 132 of shielding enclosure 130). In operation, a shield may be raised from into an up position during operation to allow for vessel launching, and the shield may be lowered into a down position for operator safety, and prevent dust, dirt and other undesired material from entering inside the launcher housing when the launcher is not in use or is in a stand-by position.

In embodiments, feed actuator 464 includes a high-speed linear ball screw type actuator and a gate 466 which includes a sliding steel plate. Upon receiving a programming command from a controller unit (e.g., as described with regard to FIG. 7), coupled to gate 466, gate 466 will raise or lower. The programming command may be based on digital data, such as a required number of RPMs to obtain a certain calculated distance, weight of the vessel(s) to be launched, gravity constant, headwinds or crosswinds, or other data and calculations providing for an accurate targeting process for launching the vessels.

Figure 6:
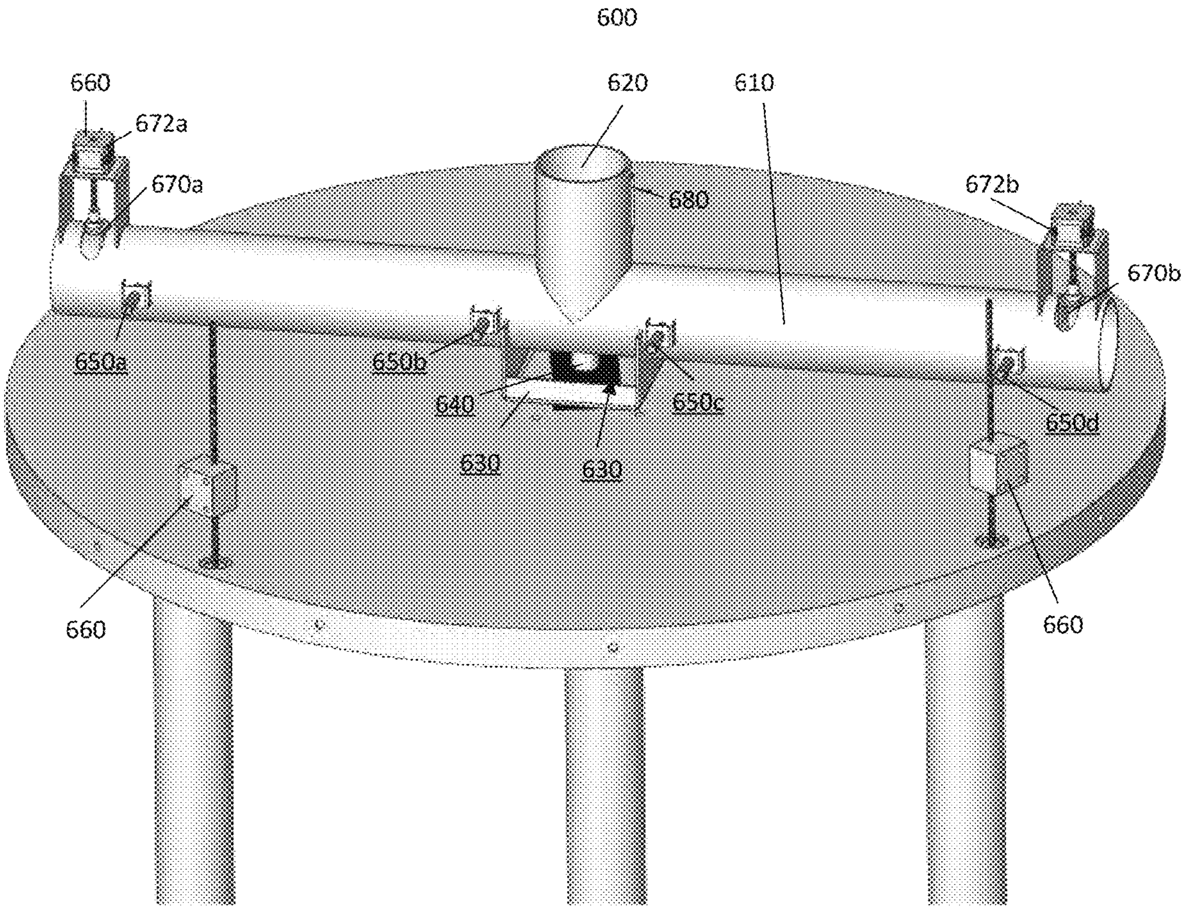
FIG. 6 shows a frontal view of a launcher system with an enclosed launcher arm, in an embodiment.

FIG. 6 shows a frontal view of a launcher system with an enclosed launcher arm, in an embodiment. Delivery system 600 includes, among other things, a rotating launcher arm 610, a feeder tube 620 integrated with rotating launcher arm 610, an arm mount 630 with associated bearing unit 632, motor shaft 640, proximity sensors 650*a*, 650*b*, 650*c*, and 650*d* attached to the rotating launcher arm 610, and servo-motor actuators 660 for a protective shield (not shown). In the embodiment of FIG. 6, motor shaft 640 includes bearings for connecting the motor shaft to the other components of the launching system. Gates 670*a* and 670*b* are controlled by corresponding actuators 672*a* and 672*b*, which open and close gates 670*a* and 670*b* at high speed according to calculations and data for how the vessels are to be launched. In the embodiment of FIG. 6, gates 670*a* and 670*b* are shown closed. Feed tube 620 and feed tube actuator 680 enable vessels to be received into the rotating launcher arm 610. In embodiments, the timing for how the vessels are received is controlled via launching data and calculations from a controller unit (not shown). In embodiments, gates 670*a* and 670*b* may be positioned at least substantially near an end of a tube.

In embodiments proximity sensors 650*a*, 650*b*, 650*c* and 650*d* are coupled to one or more components of delivery system 600 (e.g., a controller unit) to provide data to help in proper tube equilibrium as well as timing of release of vessels. A controller unit may be coupled physically, wirelessly, a combination of both or otherwise, to the proximity sensors to receive data and perform calculation. In embodiments controller unit may further be controlled to some or all of the other components of the launcher to control aspects of the launching sequence (e.g., to properly time vessels to be received into the rotating tube, and to release vessels).

Figure 7:
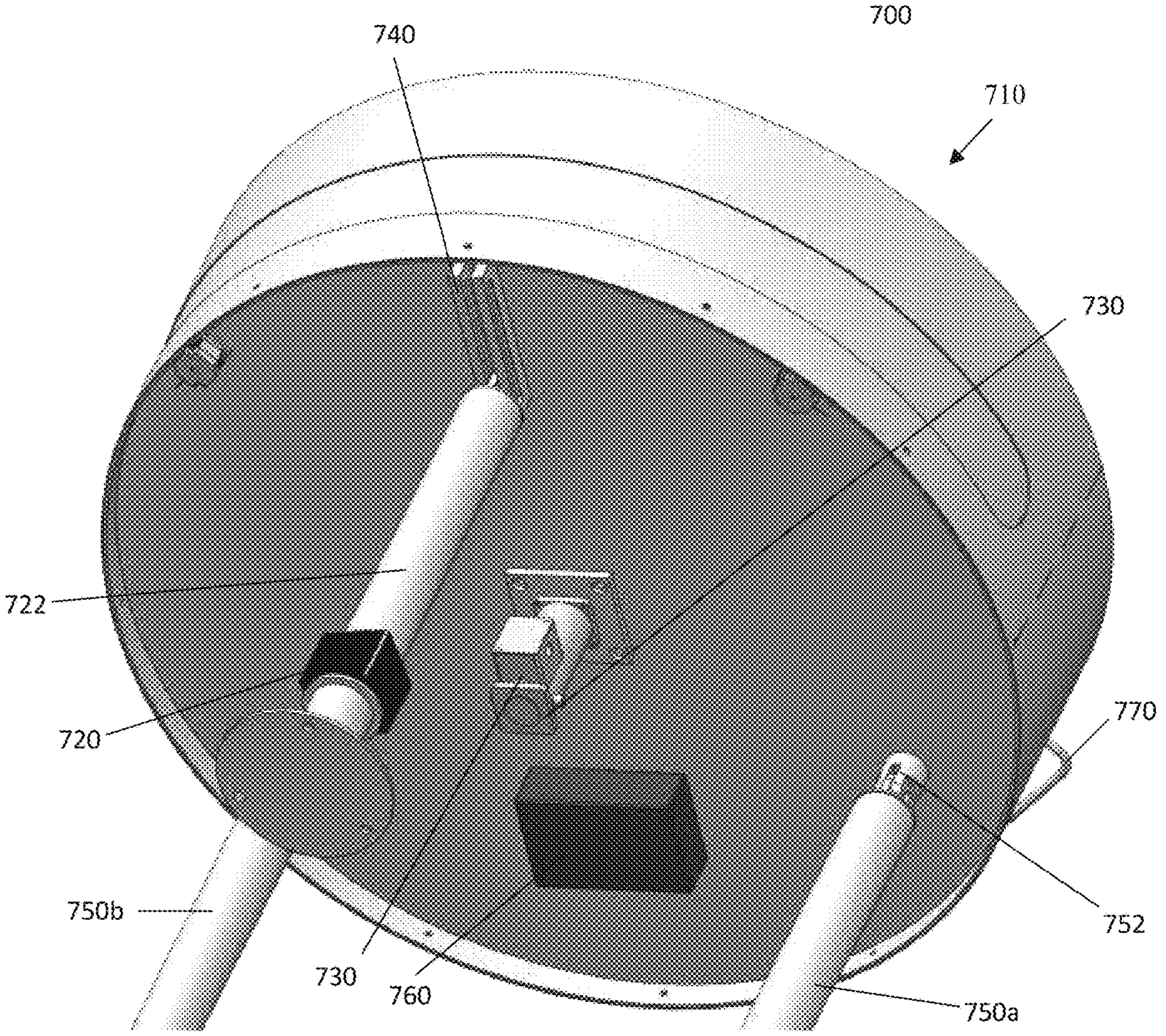
FIG. 7 shows an underneath view of a launcher including a DC motor, in an embodiment.

FIG. 7 shows an underneath view of a launcher including a DC motor, in an embodiment. Launcher 700 includes a housing 710 and servomotor-screw actuator 720 coupled to movable leg 722. As movable leg 722 is raised and lowered by servomotor-screw actuator 720, the angular facing of housing 710 will correspondingly change, providing different angles of launch for stored vessels.

With further reference to FIG. 7, motor 730 is mounted on housing 710 via motor bracket 732 to provide movement for a tube arm (e.g., with reference to FIG. 3, rotatable hollow tube arm 330) contained within housing 710. A sliding hinge 740 enables the unit to be angled and positioned as a whole for aiming and launching vessels to specific positions. Rear leg 750*a* may be additionally angled according to hinge 752, and a similar hinge may be provided for rear leg 750*b*. Control unit 760 provides electronic signals controlling operation of the launcher 700 and other components as described herein, and may include, e.g., one or more processors, memory and other components as known in the art. Among other things, control unit 760 controls operation of antenna (not shown) coupled to launcher 700 to receive wireless signals, receives desired aiming information, adjusts components of launcher 700 according to the aiming information (e.g., by modifying the height of leg 722 using servomotor-screw actuator 720), and controls rotation of a tube arm within housing 710 to launch vessels stored within. A user may hold handle 770 to lift and move launcher 700.

Figure 8:
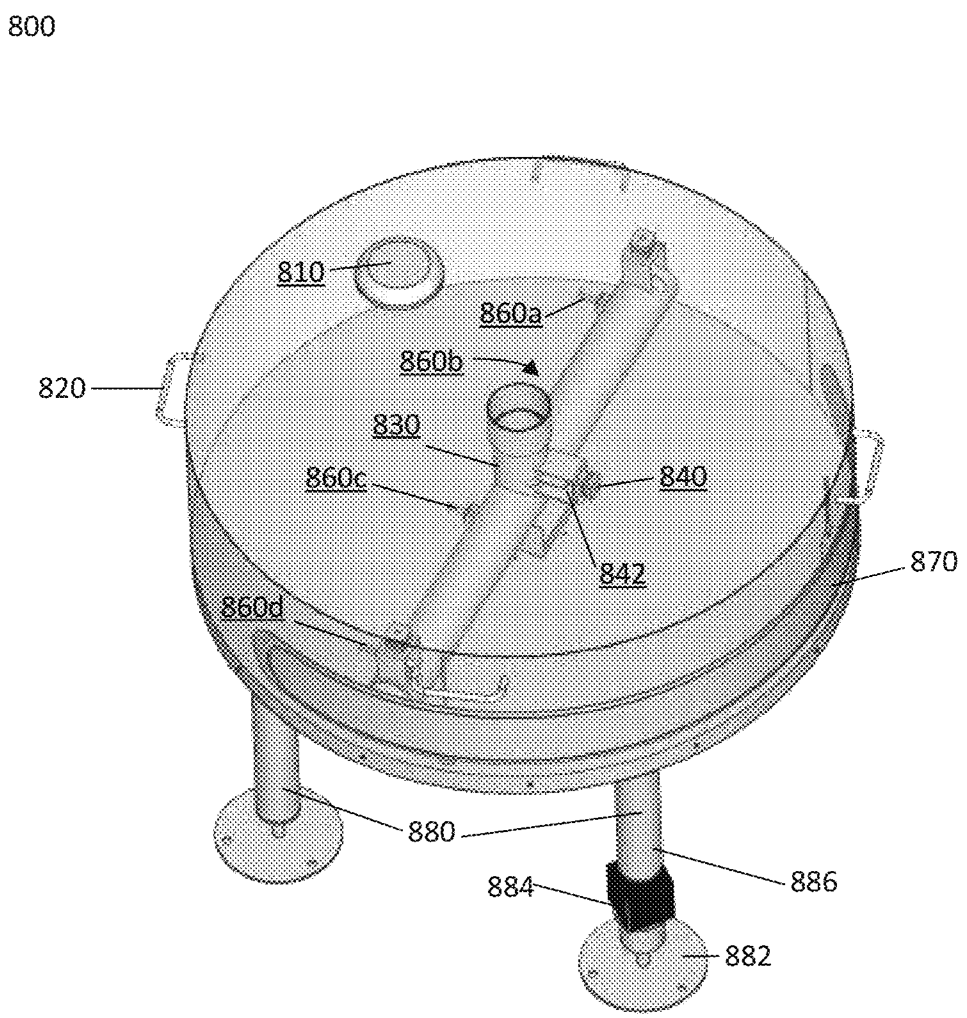
FIG. 8 shows an overhead view of launcher internal mechanisms with a feeder tube, in an embodiment.

FIG. 8 shows an overhead view of launcher internal mechanisms with a feeder tube, in an embodiment. A GNSS antenna 810 is located on a top portion of housing 800 and is configured to receive a variety of wireless signals as described herein. Handles 820 are positioned on various sides of the housing 800 to allow users to lift and move housing 800, and to enable users to gain access to the interior of the housing 800 for maintenance and troubleshooting. Vessel drop-down tube 830 includes a servo-motor actuator 840 and gate 842. A user may place vessels in drop-down tube 830, where they will either fall through into rotating arm 850 for storage and future launching if gate 842 is open or will be stopped by gate 842 if it is closed. A controller unit 852 (not shown; e.g., with reference to FIG. 7, a control unit 760) may be provided to calculate when the gate should be opened and closed to provide for stability and accurate launching, and the controller unit may be coupled to gate 842 to open and close the gate as determined to be appropriate. Proximity sensors 860*a*, 860*b* (not shown), 860*c* and 860*d* provide data, such as to controller unit 852, which is used to determine the conditions of the rotating arm 850, such as equilibrium data.

The embodiment of FIG. 8 includes a shield portion 870 which is closed to prevent launching. Legs 880 include a footpad 882 and servomotor 884 coupled to a particular movable leg 886, for raising and lowering movable leg 886.

In an embodiment, power to the actuators and gates as described herein may be provided by an inductively coupled wireless system. In another embodiment, a mechanical slip ring may be positioned at the center of a shaft of the launcher (e.g., with reference to FIG. 6, motor shaft 640), and either or both of the mechanical slip ring and shaft may be configured to receive power and data. In examples the actuators and proximity sensors may be configured to wirelessly receive data and power.

In an example, an antenna (e.g., a GNSS antenna 150 of FIG. 1) may be connected by cable to a controller box located on the underside of a launcher, or by wireless (e.g., Bluetooth) pairing with a receiver located in the controller.

Figure 9:
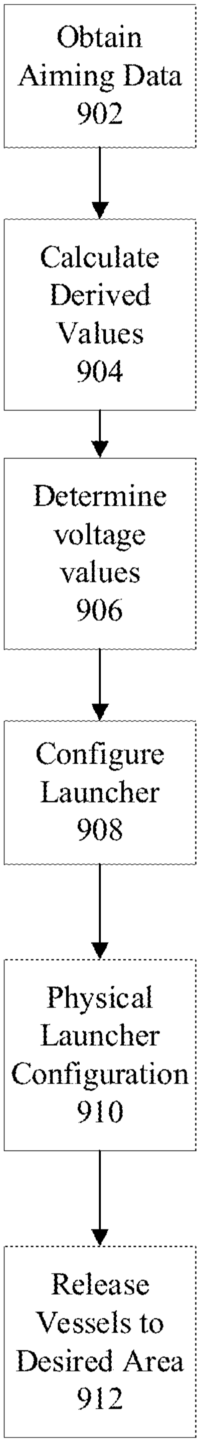
FIG. 9 is a flowchart showing a method for launching vessels, in an embodiment.

FIG. 9 is a flowchart showing a method for launching vessels, in an embodiment. Step 902 comprises obtaining aiming data. Steps as described herein may be performed at least in part by controller units coupled to launcher, such as described herein. Aiming data may include "Hot Spot" GPS coordinates for the desired delivery (e.g., to a minimum of 6 decimal points); GPS coordinates of the launcher position (e.g., to a minimum of 6 decimal points), direction, elevation of the desired delivery area, wind direction and speed (e.g., headwind or tailwind); vessel weight (e.g., within a range of weight and size); tube or arm radius; and gravitational constant. Step 904 comprises calculating derived values from the aiming data. In embodiments, these calculations may include calculating a distance between the "Hot Spot" and launcher position; a difference between elevations between the "Hot Spot" and the launcher; obtaining a wind direction and speed; determining a cross wind calculation based on the speed and pressure on the vessels to be delivered and the distance to travel; calculations of related distances; calculations for front leg screw motor/actuator positioning to obtain a desired launching angle; and calculation of revolutions per minute (RPMs) of the tube or arm for launching the vessels. In an embodiment, the launcher will reach 3000 RPM and will launch vessels up to 2 miles. In an embodiment the calculations are performed by a controller unit coupled to the launcher as described elsewhere herein. At step 906, voltage values are determined for controlling components of the launcher. In an example, the voltage value may be determined by modulating a pulse width (PWM) which is provided to a brushless geared DC motor, using a circuit configuration. Voltage values may be used, such as by a controller unit, to calculate release time, for providing an output signal to high-speed actuators for opening and closing gates of the launcher. At step 910, the launcher is physically configured according to the previous calculations. For example, a controller of the launcher may adjust the front leg using a coupled screw motor/actuator to obtain the proper angular degree. At step 912, the vessels are released from the launcher to the desired area, using at least the aforementioned data and calculations.

Figure 10:
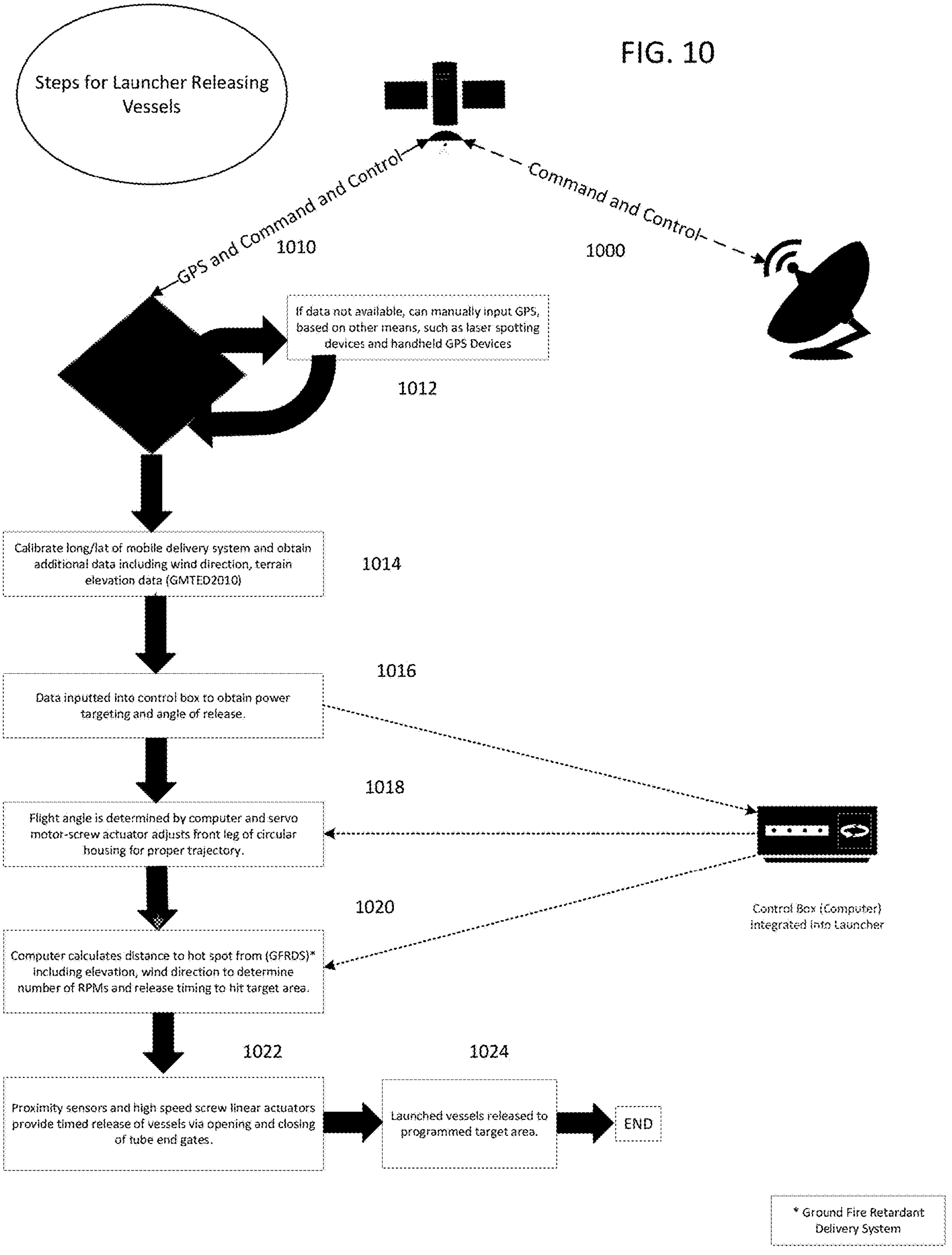
FIG. 10 shows a method for launching vessels in accordance with systems and launchers as described herein, in an embodiment.

FIG. 10 shows a method for launching vessels in accordance with systems and launchers as described herein, in an embodiment. At step 1000, a command and control signal is provided to a remote server. At step 1010, the remote server may provide a GPS signal and/or a command and control signal to a launcher system for delivering fire retardant vessels. At optional step 1012, aiming data is collected and utilized for calculations from a user. For example, a user may manually input data, such as GPS data, using devices such as laser spotting devices and handheld GPS devices. At step 1014, the longitude and latitude of the mobile delivery system as well as circumstantial data such as wind direction and terrain elevation data are obtained. At step 1016, a control box receives data (e.g., via input) and performs power targeting (e.g., calculating velocity; calculating power based on weight of vessels; distance to target; wind and environmental factors; obtaining correct RPM and controlling the motor via electronic speed control) and angle of release. At step 1018, a flight angle is determined by the computer, and the servo-motor screw actuator is utilized to adjust the front leg of a housing to obtain a proper trajectory for the launched vessels. At step 1020, a controller unit (e.g., computer) calculates the distance from the launcher (e.g., the ground fire retardant delivery system) to the hot spot, based on factors including elevation and wind direction, to determine the number of RPMs and release timing for the desired target area. The number of RPMs and release timing may further be controlled to prevent vessels from being damaged, and warnings may be presented to a user about launcher usage. For example, in embodiments the launcher operators may be informed (e.g., via a display coupled to the launcher) that the operator should not use the launcher for delivering vessels over a certain maximum distance associated with the weight of the vessel, and may further be advised that they should use vessels having appropriate weights for delivering over particular distances. Components of the launcher, such as controller unit(s) may include programming which prevents the launcher from delivering vessels at RPMs or other conditions which could damage the vessels or the launcher. At step 1022, proximity sensors and high speed screw linear actuators are used to open and close the tube end gates to provide timed release of the vessels. At step 1024, the launched vessels are released to the programmed target area.

In various embodiments of the present invention, a smaller unit could allow for input of direct data (if satellite GPS data is not available) by inputting into the controller (computer) the distance, direction and elevation and possible current wind speeds at launcher site. This data can be obtained by using existing (off-the-shelve) range-finders and other devices that utilize laser technology as well as other environmental weather information, such as wind speed and direction. This unit could be manufactured using basic similar requirements, but on a smaller unit size (less ability to reach areas at a longer distance) and a simpler input basis to be used by (property owners) consumers. In embodiments, required data is obtained and uploaded manually or by a USB connection or pairing device (Bluetooth technology) to a controller in a digitally controlled mobile ground launching fire retardant unit by obtaining distance data (e.g., via off-the-shelf rangefinders and GPS devices) as well as other available data, e.g., wind direction and speed. Data may be obtained, for example, from available web-based sites. Customized data may thereby be provided from specific sources for coordinates, distances, wind speed, direction and other environmental data.

In one embodiment, a mobile horizontal single tube (constructed from, e.g., lightweight carbon-fiber or lightweight high strength steel) tube is centered on a vertical shaft of a direct current electric motor with ability to have variable speeds from approximately 500 to 3,000 RPMs. The motor is of a high torque quality and the tube is housed and spinning within a containment vessel with an opening releasing area on both ends of the tube for deployment of (commercially available) soft-ball size object(s) weighing 2 KG or less, fire retardant incapsulated vessel(s), at a high velocity, reaching distances which previously would be considered unreachable by fire personnel for (inaccessible terrain). In an embodiment, the unit is capable of launching vessels up to 2 miles away.

The rotating arm may be made of a lightweight, high tensile strength material such as carbon fiber or lightweight steel and designed as a hollow tube with an interior diameter (ID) that is slightly larger than the outside diameter (OD) of the soft-ball size incapsulated retardant vessel. The hollow tube is centered on an DC motor, which is located below the housing unit.

In embodiments, at each end of a hollow tube (e.g., the tube arm 330 of FIG. 3) is an opening allowing for a soft-ball size vessel to be released when a gate trap is activated and opened to allow full release of the vessel. The trap gate is operated by a wireless servo-motor with a high speed linear actuator and is designed to release a single vessel item or multiple vessel units (utilizing wireless capacitive proximity sensors) at a controlled time basis by a computer program based upon the proper number of revolutions being reached by the tube when it meets the necessary calculated acceleration to reach the targeted area.

The computerized release may be accomplished by a program that takes the target coordinates (GPS) from the (hot-spot) satellite data and calculates distance determined by the GPS calibration of the unit placement area reached by fire personnel for delivery to the hot spot area and the determination of the elevation requirements to target area. Notably, the USGS and the National Geospatial-Intelligence Agency (NGA) have collaborated on the development of an enhanced global elevation model called the Global Multi-resolution Terrain Elevation Data (GMTED2010), which has replaced GTOPO30 as the elevation dataset of choice for global and continental scale applications which would result in a different calculation for the electric DC motor for the necessary acceleration to be reached. Additional data including wind direction and other outside environmental conditions that may impact the flight of the vessel(s) also will be included in the instructions to obtain proper targeting. A homeowner version would include providing data either manually or by means of wireless connection via a computer tablet or smart phone, to obtain proper targeting.

The release mechanism may be triggered when the program output provides the optimum RPMs of the tube to reach the computed distance and the proper angle of release (elevation), by providing precise azimuth and elevation axis information to the front servo-motor/actuator leg of the unit. A precise direction based upon GPS coordinates received or line of sight range-finder and other possible outside environmental conditions may have been predetermined and programmed into the computer/control box, or may be inputted by a user.

In embodiments, the tube has single or multi number of vessels inside each side of the tube and release of a single one on each side of the tube or multi number released in an equal as possible basis will help maintain proper weight balance of the tube and eliminate any possible imbalance. For example, a convex weld may be provided at the bottom of a rotatable tube or arm to reduce the effect of static motion by vessel(s). This motion may result in a jamming effect with other vessels being loaded while the tube of in motion. This can be accomplished by utilizing and releasing additional vessels either manually via the center opening or from a hopper/sleeve apparatus when the proximity sensors provides information back to the computer for proper tube balancing. Besides obtaining accurate elevation data, additional data such as wind speed, air density and other outside environmental conditions can also be obtained and calculated for achieving an accurate hit area for the fire target.

In embodiments, the determination of the velocity will automatically be calculated for speed control and relayed to the DC motor for obtaining the proper number of RPMs to reach the target area. Calculations for distance may be determined on the basis of RPM's obtained prior to the release of the vessels. The determination with a 2 ft radius has a circumference of 2× Pi×r=2×3.14×2=4Pi=12.57 ft. For a 2 mile range example with a 1.5 lb. vessel, exit velocity at 39 degrees would need to be 589 ft/see; at a 12.57 ft circumference (RPM/60)=589 ft/sec. 589 ft/see/12.57 ft=46.85 rev/see x 60=2811 RPM (RPM=(60× Velocity).

For other lower distances, required RPMs for exemplary distances would be:

$$500\,ft\ldots(128\times60)/12.57=611\,RPM$$

$$1320\,ft\ldots(209\times60)/12.57=997\,RPM$$

$$2640\,ft\ldots(296\times60)/12.57=1412\,RPM$$

$$5280\,ft\ldots(418\times60)/12.57=1995\,RPM$$

Elevation/angle will be determined, and the programmed output will be sent to the individual front leg servo actuator for proper automatic adjustment based on the measurement of elevation. In various embodiments, if target line is encumbered by trees or other physical barriers that may conflict with the vessels being deployed, a manual override would be available to provide a steeper angularity of flight, which would result in a different calculation for the electric DC motor for the necessary acceleration to be reached. Direction is also automatically determined based on the programming and obtained GPS coordinates resulting in being in true alignment with the target area.

In one embodiment of the present invention, if a sightline is open (non-encumbered by trees, smoke or even buildings) and (hot-spot) satellite coordinates are not available, a line of sight optics laser beam (off-the-shelf) long distance rangefinder attached to the housing unit by magnet or suction cup above the opening of the deployment container, can provide distance to target area as well as elevation of the target area. This data along with target direction, wind speed and direction of wind, can be provided to the controller unit which will allow for deployment with proper alignment and distance to the target area. Reaching the proper distance will be accomplished by having a servo-motor and linear screw actuator located on the front leg of the housing unit obtaining the correct degree angle of the unit/tube along with the DC motor reaching the proper RPM's resulting in a properly timed (opening of end of tube gates) release of the vessel containers to the target area, based on controller instructions.

The placement of the device is critical and a step to calibrate placement will take place to include delivery system GPS coordinates (this can be accomplished by the use of existing market available technology using a handheld device or having a powerful mounted GPS unit on the housing) and other outside data regarding windspeed, direction of such windspeed and other possible outside environmental conditions that could impact the flight pattern of the vessels so to correct for such conditions. GPS measurements and elevation determination regarding the target area are also inputted into the control box to obtain proper targeting and angle of release. Tube has a programmable release mechanism to allow object/material to be released at a designated time after obtaining the proper velocity, angle of release (trajectory) and the GPS coordinates both from target area and deployment area.

Design of the system includes for the release of softball-size vessels of fire retardant to be quickly and/or periodically released (e.g., within at least approximately 30 milliseconds) from each other in the same required direction from each end of the tube. A gravity fed hopper or sleeve, holding additional vessels can be added to a top opening of the tube with an opening in the housing unit to allow for multi number of vessels to be targeted in a single target area (hot spot) or a fire defense line in an area where heavy fuels are not present, i.e., small brush/grass fires. The tube design will hold multi-number of containers of fire retardant (vessels) or other material that is used to fight a brush or grass fire or other fires that may need a fire barrier. Manually placing vessels into the opening can take place without the use of a hopper or sleeve. Use of other possible material being placed in the vessels to help in setting back-fires or even other vessel type items could also be developed for deployment.

Keeping the Ground Fire Retardant Delivery System (GFRDS) on the trailer and moving the trailer into an open area for proper placement and stability should take place. The GFRDS can also be moved by hand by two individuals and should be placed on a stable mounting base to achieve the necessary stability for a proper flight alignment to the target area. Flight angle is determined by the program and the front leg is adjusted by electronic means via a linear screw actuator operated by an individual servo motor in the front adjustable leg.

In various embodiments, a digital control box with capabilities of obtaining outside (encrypted) secure data including satellite data and data from the local placement of the device for purposes of calibrating current longitude and latitude data using the 6th decimal place for the coordinates for both target area and deployment area to obtain proper measurements for distance and elevation accuracy. Any (hot-spot) coordinates if received by local fire or State or Federal Forest Service personnel directly can be transferred by wireless means to the controller box by setting up a paired device using Bluetooth technology. Magnetic interference at the time of unit placement should also be obtained and relocation may be needed for achieving proper calibration and site deployment as well as maintaining proper target coordinates.

In other embodiments, the device is mobile enough to be set up by one or two people who have received the proper training and is battery powered and/or electrical power received from a stand-a-lone generator or vehicle, or other means can take place. The device for stability and quicker mobility can be placed on a small trailer behind a truck or vehicle. This will allow firemen or other trained individuals to drive up closer to an area that may have an inaccessible spotted fire for set-up and disbursement. Keeping the unit attached properly to the trailer (secure), calibration and set-up can take place with unit on the trailer if in an open area and terrain allows for such. Removing the unit to allow for better targeting can also take place. Set-up, including calibrating the actual location of the device and obtaining the proper satellite GPS or other permissible data relating to the hot spot will allow the device to automatically calibrate and adjust the front leg beneath the device to obtain the proper trajectory angle as well other data to calculate necessary velocity to reach the proper arm (tube) RPM; direction, including release timing of suppression containment items.

In other embodiments, a dual frequency receiver or augmented system installation may be needed. Required GPS Interface Specifications (5th edition) states compliance specifying GPS minimum performance parameters; the SPS PS serves as a complement to the GPS SPS SIS Interface Specifications (IS-GPS-200 and IS-GPS-705), which provide relevant information for design and fabrication of GPS civil receiver equipment. In further embodiments, the controller unit of a launcher may include a GPS receiver which is WAAS-enabled. Such a GPS receiver may receive data for WAAS corrections to GPS data, and the controller unit will compute WAAS corrections according to the received data.

If satellite information (hot spot) coordinates are not available for some reason, the system of the present invention can be inputted regarding a (hot spot) area, by utilizing other possible means of obtaining the GPS coordinates such as handheld GPS devices, as well as laser spotting devices, such as current off-the-shelf rangefinders that can measure far distance line of sight distances and even the use of an unmanned aircraft that can provide necessary information such as elevation, GPS coordinates and wind direction in the fire zone back to the user to manually enter into the program or connect wireless (with a paired device) or by using available USB port in the controller.

A scaled down version of the mobile ground fire retardant delivery unit for civilian-type usage (rural homeowners in fire prone areas) could advantageously be designed to provide a simpler method of determining the required target or a fire line around a home or property. That unit would have a simplified control box that provides simple input by use of off-the-shelf laser-rangefinder equipment or other means such as a software application information, for example Google Earth or Google Maps, which can provide coordinates to the 6th and 7th decimal point regarding longitude and latitude, as well as distance data (Google Maps). Elevation, compass direction for a targeted area are also available on (off-the-shelve) GPS devices and rangefinders, which can help in even providing data for obtaining an extended suppression line from point A to B.

It is envisioned that one embodiment of the present invention can be configured to provide for the mounting on the top the housing unit above the deployment opening by a fixed mounting or the use of magnetic or suction cup that are available with the (off-the-shelf) laser rangefinder.

Another embodiment is envisioned that will utilize different types of spheres/vessels that can provide different outcomes, e.g., incendiary spheres.

A further embodiment is envisioned that will incorporate a display screen that obtains Google Earth/Google Maps with latitude/longitude turned on providing map data that can provide 7th place decimal point latitude/longitude as well as measured distances of the zoomed in area of where fire line should be targeted and data can be inputted into the controller/computer unit.

INDUSTRIAL APPLICABILITY

The present invention pertains to a digitally controlled mobile ground launching fire retardant delivery system that allows for the delivery of fire retardant to a small fire area, which is considered inaccessible by fire personnel, due to the terrain and possible elevation, which may be of value or importance to various industries, such as, but not limited to, the firefighting industry.

What is claimed is:

1. An apparatus for delivering fire retardent vessels, comprising:
- an antenna;
- a receiver;
- a base;
- a vertical shaft through the base;
- a rotatable hollow tube arm mounted on the vertical shaft, wherein the rotatable hollow tube arm comprises an opening configured to allow the fire retardant vessels to pass through and a release mechanism;
- a plurality of legs coupled to the base, including a front leg having a servo-motor configured to adjust the height of the front leg, so as to change an angle of the base and the rotatable hollow tube arm;
- a computing device including a display screen, one or more processors and a memory containing one or more sequences of instructions, the computing device configured to receive launching data via the receiver and antenna, the launching data comprising comprising Global Multi Terrain Elevation Data and specific coordinates from a Global Navigation Satellite System, the memory and the one or more sequences of instructions configured to, with the one or more processors, cause the computing device to calibrate the servo motor and adjust the height of the front leg using the servo-motor without user input.

2. The apparatus of claim 1, wherein the rotatable hollow tube arm has a radius of approximately two feet.

3. The apparatus of claim 1, wherein the apparatus further comprises a motor coupled to the vertical shaft.

4. The apparatus of claim 1, wherein the apparatus further comprises one or more fire retardent vessels positioned within the rotatable hollow tube arm, and wherein the release mechanism comprises a gate trap configured to release the one or more fire retardent vessels from the rotatable hollow tube arm at timed intervals.

5. The apparatus of claim 4, wherein the release mechanism further comprises one or more proximity sensors.

6. The apparatus of claim 1, wherein the rotatable hollow tube arm further comprises a feeder entrance at least substantially perpendicular to the rotatable hollow tube arm to receive the fire retardent vessels.

7. The apparatus of claim 1, further comprising a removable housing to at least substantially enclose the rotatable hollow tube arm.

8. The apparatus of claim 1, wherein the rotatable hollow tube arm is configured to deliver launching vessels up to two miles away.

* * * * *